Nov. 13, 1962

LARS-AXEL TJEDER

COMMUNICATION CALL APPARATUS 3,064,081

Filed July 11, 1958

2 Sheets-Sheet 1

Inventor
L-A. Tjeder
By Glascock Downing & Seebold
Attys.

Nov. 13, 1962

LARS-AXEL TJEDER 3,064,081

COMMUNICATION CALL APPARATUS

Filed July 11, 1958

2 Sheets-Sheet 2

INVENTOR
L-A Tjeder

BY Glascock Downing Seebold
ATTORNEYS

3,064,081
COMMUNICATION CALL APPARATUS
Lars-Axel Tjeder, Malmkoping, Sweden
Filed July 11, 1958, Ser. No. 747,991
Claims priority, application Sweden Jan. 18, 1958
4 Claims. (Cl. 179—37)

The present invention relates to communication call apparatus, and more particularly in the form of a table model, containing call lights having signal lamps arranged above each other, which lamps may, in known manner, be protected by means of transparent windows.

It is a general object of the invention to provide communication calling apparatus, which may establish communication between two or more persons in a most simple way.

To this end according to the invention, call lights are fitted into an arm extending upwardly from a base and designed to form a handle with the upper part of said arm containing a telephone receiver and the base containing a microphone as well as switching means both for the call lights and for the telephone members.

In order that the invention may be clearly understood and readily carried into effect an embodiment thereof and examples of the use thereof are hereinafter more fully described with reference to the accompanying drawings, in which.

Figure 2:
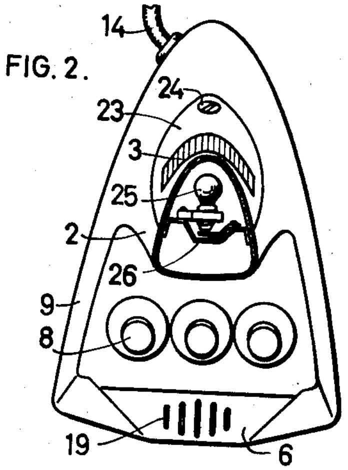
FIGURE 2 is a section taken on the line 2—2 of FIGURE 1.

The apparatus shown is a table model, which is formed with a base 1 and an arm 2 extending upwardly therefrom and designed as a handle by means of which the apparatus may be lifted from the table and held in the hand like a telephone handset. The arm 2 inclines forwardly above the base 1 and its upper side, i.e. the side facing away from the base, is provided with three windows 3 disposed one above the other and constituting the visual call panel. On the opposite side of the arm 1 at the upper end thereof, a telephone receiver 4 is fitted in, which communicates electrically with a microphone 5 located in the base 1 inside the end wall 6 of said base and facing away from the arm 2. The base 1 is, as seen in plan view in FIGURE 2, substantially triangular in form and forms a box the upper side 7 of which may be provided with one or more push buttons 8. In certain types, only one push button is required, whereas in other types up to five push buttons may be placed on the upper side 7 or, if desired, on the side walls of the base. In the latter instance, the push buttons preferably occupy recessed positions in the wall.

By means of the push buttons 8, contact spring groups 10 may be actuated for the purpose of obtaining flashing signals, a call signal and for connecting combinations of the signal lamps into circuit. A distribution box 11 is disposed on the base plate 12 of the base 1. Said distribution box is provided with a mercury switch 13 forming a telephone contact, by means of which the telephone may be connected to the network by inclining the apparatus from the position which it occupies when placed on a horizontal surface such as a table. As long as the apparatus is standing on such surface or table, the switch 13 is open. Leading from the distribution box is a cable 14, which contains telephone lines as well as the connecting wires of the call panel, which cable is provided with a pin plug 15 intended to be inserted in a wall or other such co-operating socket. According to the example, said plug has eight annularly arranged contact pins 16.

The wall of the arm situated in front of the telephone receiver 4 has slit openings 18 so that the diaphragm sound may easily be heard. Similarly, the wall 6 in front of the microphone 5 also has slit openings 19. The microphone 5 is retained in place by means of a clamping spring 20, which is secured to the bottom plate 12. A similar arrangement is provided for the telephone receiver 4 where a clamping spring 21 rests at one end against the box containing it with the other end of the spring fixed to a bracket or lug 22 on the inside of an adjacent portion of the wall. In order to facilitate the mounting of the different members inside the apparatus, the bottom plate 12 may be removable and the arm 2 is provided with a detachable casing portion 23, which forms the upper side of the arm and is secured by means of screws 24. Upon the removal of the casing portion 23, the interior of the arm 2 becomes freely accessible for the mounting of the telephone receiver 4.

In the casing portion 23, signal lamps 25 are mounted on brackets 26 behind the windows 3 which are in this part of the apparatus.

Figure 3:
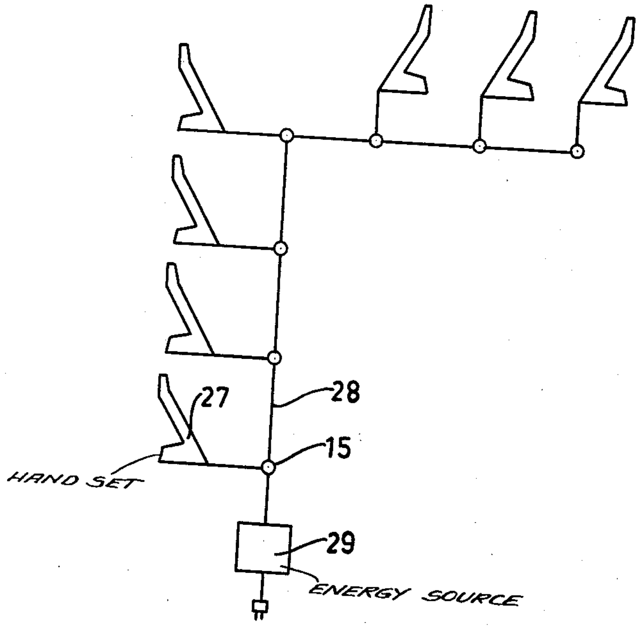
FIGURE 3 shows diagrammatically the manner of connecting the apparatus in a circuit, FIGURE 4 indicates a wiring diagram for the apparatus according to FIGURE 3.

FIGURE 3 shows a number of apparatus 27 connected to a common cable 28 by means of pin plugs 15. These apparatus are provided with five switches for buzzer, flashing lamps and signal lamps. By means of this system, all may call and speak to all. A central source of energy for both the telephones, lamps and buzzers for the entire system is designated as 29.

Figure 1:
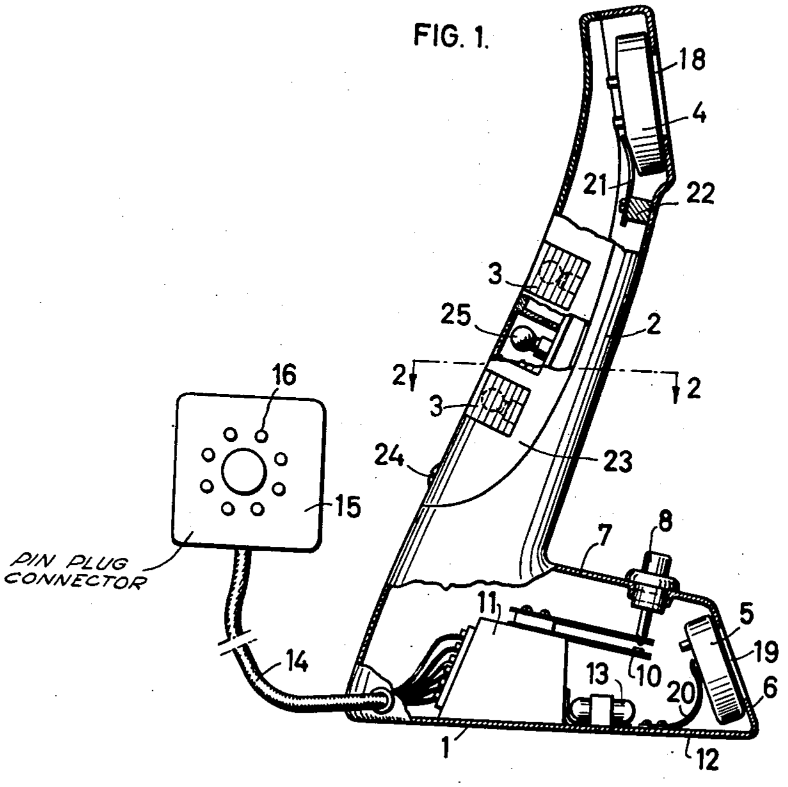
FIGURE 1 is a side view, partially in section, of the apparatus.
Figure 4:
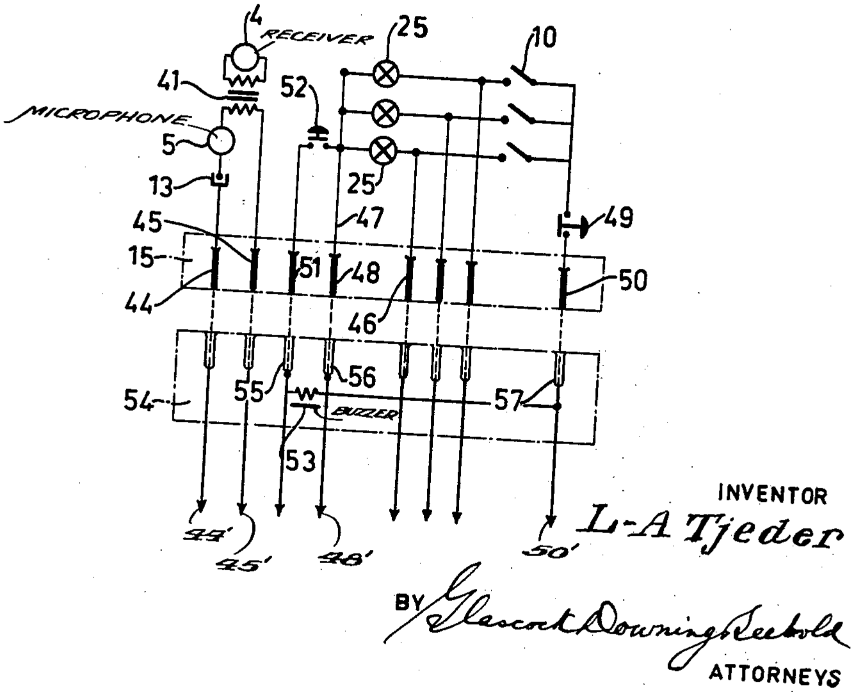

Of course, the wiring diagram for an installation varies with the extent of the equipment. Thus, there is shown in FIGURE 4 an example of a wiring diagram for the apparatus contained in the system according to FIGURE 3. In this instance, the telephone receiver 4 is connected via a transformer 41 to the microphone 5, which in turn via the telephone contact 13 communicates with a contact pin 44 in the plug 15 of the kind having eight pins and shown in FIGURE 1. The other pole of the transformer is connected to a pin 45. The signal lamps 25 communicate, on the one hand, via a common line 47, with pin 48. In order to obtain flashing lights each of the lamps is, by means of a corresponding switch 10, arranged for being selectively wired up to a flashing contact 49 connected to a pin 50. Associated between the line 47, which is intended for current supply, and a pin 51 is a push button 52 for buzzer 53. This latter is mounted in a plug socket 54 and is connected to a contact sleeve 55. Contact sleeves 56 and 57 are connected across the current supply source 29 by leads 48' and 50'. This sleeve 57 is intended to receive the pin 50, which may be connected with the switches 10. The sleeve 56 corresponds with the pin 48 and the sleeve 55 with the pin 51 so that the buzzer 53 may be connected into the circuit by means of the push button 52. In the plug socket there are also provided sleeves for the pins 44, 45 which are connected to the power supply 29 for the telephone circuit through leads 44', 45'. As is well understood, all of the sleeves in socket 54 are connected to corresponding sleeves in each of the other sockets which receives the plug 15 individual to each telephone 27 so that they are all operated in parallel. As will be clear from the wiring diagram, there is a possibility of selecting, by means of the switches 10, the desired calling combination and, as the case may be, of combining this latter with flashing lights by actuating the flashing contact 49. Thereafter, the telephone communication may be established on lifting the apparatus.

The apparatus according to the invention is easily exchangeable due to the pin plug and may be transferred from one room to the other according to requirements.

Since the apparatus can be placed on the writing table, the calling signals are easily observed. By reason of the fact that the arm 2 has a certain inclination, the visual call panel faces obliquely upwards, which makes the light-signals striking to the eye also for a standing or walking person. The telephone communication is established by lifting the apparatus from the table and holding it in a position differing from the table position. This deviation takes place automatically, because the telephone receiver and the microphone are mutually so disposed that the use of the telephone enforces a laterally inclined position.

What I claim is:

1. A communication and call apparatus comprising a telephone instrument of the hand-set type including a housing having an enlarged base to rest on a support and having a front wall portion, a transmitter within the base behind the wall portion, a handle portion extending upwardly from the rear portion of the base and supporting a receiver adjacent its free end and forwardly thereof, a plurality of vertically spaced signal lamps mounted within the handle portion and visible rearwardly thereof, leads extending into the housing and connected to the lamps for energizing them, separate transmission leads extending into the housing for connection to the transmitter and receiver, and manual switch means for selectively connecting the signal lamps to a source of power independently of the telephone circuit.

2. A communication and call system comprising a plurality of stations each having a telephone hand set thereat, each hand set including a housing for the receiver and transmitter, at least three signal lamps supported by each of the housings, conductors connecting each lamp in each housing in parallel with corresponding lamps in other housings, a telephone circuit interconnecting all of the hand sets for intercommunication, a source of power for energizing the telephone circuit and the lamps, and manual switch means for selectively connecting the parallel lamp circuits to the source of power independently of the telephone circuit to energize corresponding lamps in all of the housings.

3. A communication and call system in accordance with claim 2, in which said switch means comprises a plurality of manually operated switches mounted in each housing and corresponding to the number of lamps therein, each of said switches being connected between the source of power and its corresponding lamp.

4. A communication and call system in accordance with claim 2, including audible signalling means at each station, means connecting the audible signalling means in parallel, and switch means at each station for connecting the audible signalling means to the source of power.

References Cited in the file of this patent

UNITED STATES PATENTS

| | | |
|---|---|---|
| 2,338,757 | Curran | Jan. 11, 1944 |
| 2,390,203 | Campbell | Dec. 4, 1945 |
| 2,410,434 | Edwards | Nov. 5, 1946 |
| 2,419,388 | Blomberg et al. | Apr. 22, 1947 |
| 2,822,432 | Blomberg | Feb. 4, 1958 |
| 2,845,492 | Kaye et al. | July 29, 1958 |